Sept. 5, 1961  J. S. ALFORD  2,998,958
COOLING STRUCTURE FOR TURBINE WHEELS
Original Filed March 12, 1952

Inventor:
Joseph S. Alford,
by Richard E. Horley
His Attorney.

2,998,958
Patented Sept. 5, 1961

2,998,958
COOLING STRUCTURE FOR TURBINE WHEELS
Joseph Savage Alford, Cincinnati, Ohio, assignor to General Electric Company, a corporation of New York
Continuation of application Ser. No. 276,134, Mar. 12, 1952. This application Sept. 26, 1956, Ser. No. 612,332
1 Claim. (Cl. 253—39.15)

The present invention relates to gas turbines such as used on aircraft and specifically to the cooling of the turbine wheel of a supercharger, although it is not necessarily limited thereto. This application is a continuation of my patent application Serial No. 276,134, filed March 12, 1952, now abandoned.

The motive fluid used for operating aircraft turbosuperchargers is composed usually of exhaust gases having temperatures of the order of 1400° F. or higher, so that the material of the turbine wheel adjacent the buckets exposed to such high temperatures may be weakened considerably. Furthermore, additional heating from the after-burning of fuel-rich exhaust gases in the vicinity of the buckets on the downstream side of the wheel makes the protection of the turbine wheel from the heat of the gases of the motive fluid a virtual necessity.

In the prior art, cooling caps or disks are used to protect the centers of the turbine wheels, and the rims of the wheels adjacent the buckets are cooled by one or more jets of air, which spread out more or less uniformly in all directions after impingement. In those cases where spillband structure is used with the cooling disks, after impingement of such a jet on the wheel periphery beyond the limits thereof, that portion of the deflected air which flows radially outward does not adequately contact the rim surface area, and consequently is not very effective in cooling. Furthermore, when a compressor is bled to obtain relatively high pressure cooling air, economy in the use of such air is an important factor.

In order to secure greater transmission of heat from the wheel rim to the air and at the same time obtain this economy, it is an object of my invention to provide an improved construction for the cooling of wheels used in turbosuperchargers.

It is another object of my invention to provide for more effective cooling on the discharge side of rotor wheels such as used in aircraft gas turbines.

These and other objects of the invention will become apparent upon a reading of the following description taken in connection with the drawing in which FIG. 1 is a front elevation, partly in section, of a gas turbine arrangement embodying my invention;

Figure 1:
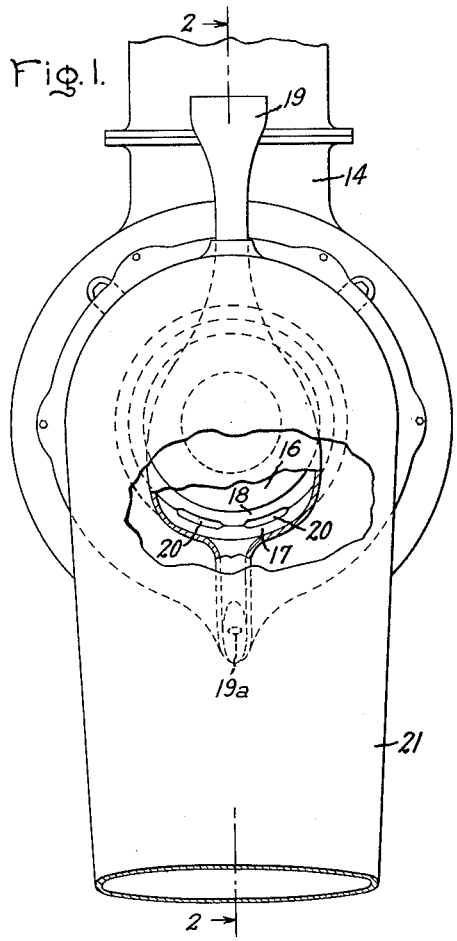

In accordance with the illustrated embodiments of my invention, a channel is provided between the discharge opening for the cooling air jet or jets and the outer periphery of the turbine wheel, for trapping the radially outflowing portions of the cooling air after its impingement.

Referring to the drawing, the disclosed structure comprises a turbine bucket wheel 10, with a row of buckets 11, carried by shaft 12 mounted in bearing 13, for driving a supercharger (not shown). The motive fluid is supplied to the turbine wheel from nozzle box 14 through nozzles 15, from a conventional source of operating fluid (also not shown), against the row of buckets 11.

A cooling construction, A, is located on the side of the wheel opposite that of the intake of the motive fluid and includes a cup-shaped disk or cooling cap 16, which supports a pair of radially spaced, axially extending, annular U-shaped channels or spillbands 17, 18, mounted in concentric relationship adjacent the periphery of the bucket wheel 10 and in close clearance therewith. A conduit 19 is secured to the cooling construction at the outer spillband 17 and extends diametrically across disk 16 to form a chamber with it, with one or more outlets 20 therefrom located between the channels or spillbands. These outlets may extend either partly or completely around the outer periphery of the turbine wheel and serve to discharge a supply of cooling medium, such as air, against it, from a source, such as a compressor or the slip stream of the aircraft. The exit of conduit 19 is indicated at 19a.

In the cooling process, the pressurized air is directed against the outer periphery of turbine wheel 10 where it spreads radially inwardly and outwardly, the flow being caught within the respective channels 18 and 17. The centrifugal effect of that portion of the cooling air given a tangential velocity by boundary layer action from the turbine wheel causes a large recirculation within the U-shaped channels, providing for more extensive contact with, and so better cooling of, the wheel. This is disclosed best in the modification of FIG. 3, wherein the arrows delineate the recirculating flow of the impinged cooling fluid, which eventually joins the exhaust from the bucket wheel, both being discharged into the atmosphere through a conventional exhaust casing 21.

To protect the center of the turbine wheel on the intake side, as well as the shaft supporting bearing, from heat, a barrier, such as annular wall 22, projects close to the surface of the turbine wheel within the periphery of the admission nozzles to effectively block the passage of heat inwardly from the nozzle box.

Figure 2:
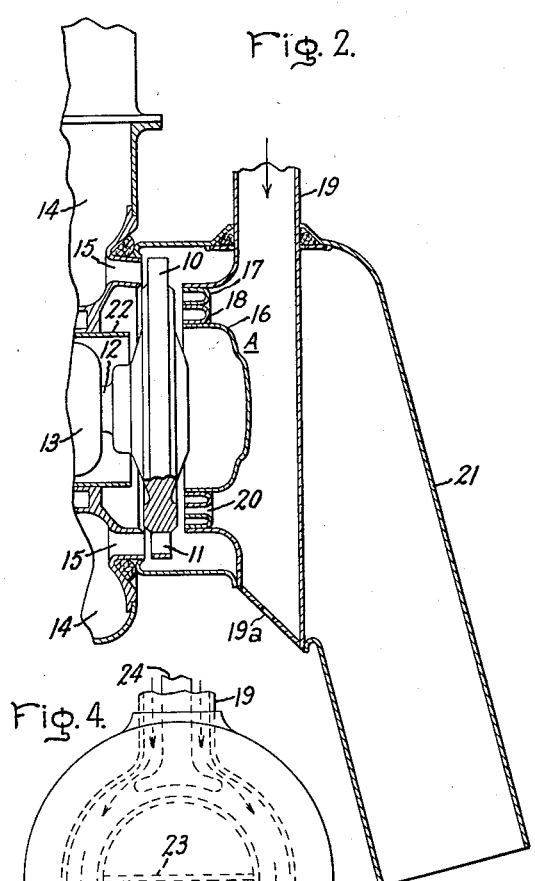
FIG. 2 is a sectional view taken along line 2—2 of FIG. 1.
Figure 4:
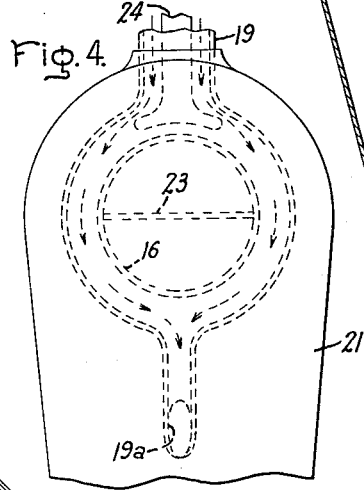
FIG. 4 is a generalized front elevation of the modification disclosed in FIG. 3.
Figure 3:
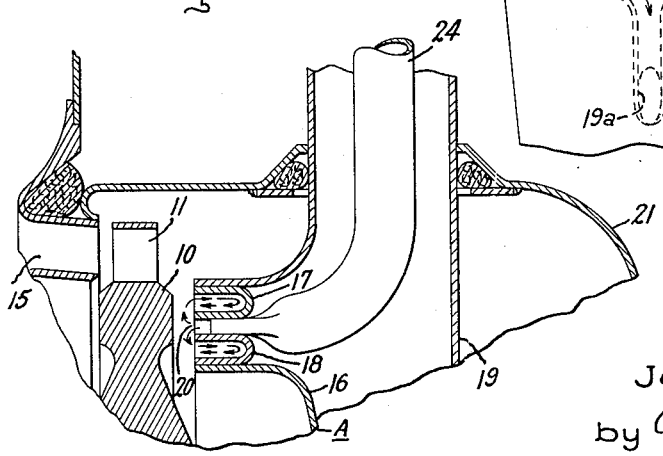
FIG. 3 is an expanded fragmentary sectional view of a modification of the structure disclosed in FIG. 2.

In the modification disclosed in FIGS. 3 and 4, like reference numerals bear the same numbers as in FIGS. 1 and 2. Conduit 19, again, is secured to the cooling construction A at the outer spillband 17 and also by baffle 23 to disk 16. This baffle extends diametrically across the exterior domed surface of disk 16 (see FIG. 4) and is fastened to the opposite wall surface of conduit 19 to obstruct the chamber formed thereby so that the cooling medium furnished by conduit 19 is forced to flow around it and over the spillbands and so cool the exterior surfaces of the cooling construction. This flow over the exterior of disk 16 is shown by the lines of arrows in FIG. 4.

Outlets 20, located between the U-shaped channels or spillbands 17, 18 are the discharge openings for the cooling medium supplied from conduit 24, from a relatively high pressure source of supply, such as the compressor discharge. The modified structure of FIGS. 3 and 4 is to be used when the static pressure in the exhaust casing is relatively high.

Although a preferred embodiment and modification of my invention has been shown and described, it will be readily understood by those skilled in the art that variations may be made in the disclosed structure without departing from the basic features of my invention. It is desired that my disclosure be considered illustrative and inclusive of all modifications and variations which may fall within the true scope of the appended claim and not limitative to the exact construction therein.

What I claim as new and desire to secure by Letters Patent of the United States is:

In combination with a turbine wheel, a cooling system for cooling said turbine wheel with a gaseous fluid comprising duct means for conducting gaseous cooling fluid from a source to said wheel, a pair of concentrically positioned U-shaped channels positioned adjacent said wheel near the periphery thereof with the open sides of said channels facing said wheel, means connecting the closed sides of said channels to said duct means, said connecting means being thereby supported by said duct means, and outlet means formed between said channels by radially spaced apart portions thereof to direct said gaseous cooling fluid against the side of said wheel in a direction substantially parallel to the axis of rotation of said wheel, whereby said gaseous cooling fluid impinges against said wheel at a radial position located between and immediately adjacent the open sides of said channels, said channels being thereby located along the radial flow path of said gaseous cooling fluid after it impinges on the wheel to trap portions of said fluid within said channels and recirculate same against said turbine wheel to provide prolonged contact between the cooling fluid and said turbine wheel.

References Cited in the file of this patent

UNITED STATES PATENTS

| | | |
|---|---|---|
| 2,234,757 | Gibson | Mar. 11, 1941 |
| 2,234,767 | Larrecq | Mar. 11, 1941 |
| 2,348,748 | Nichols | May 16, 1944 |
| 2,364,037 | Smith | Nov. 28, 1944 |
| 2,463,898 | Moore | Mar. 8, 1944 |
| 2,605,081 | Alford | July 29, 1952 |
| 2,620,157 | Morley | Dec. 2, 1952 |
| 2,759,700 | Wheatley | Aug. 21, 1956 |

FOREIGN PATENTS

| | | |
|---|---|---|
| 580,225 | Great Britain | Aug. 30, 1946 |
| 584,873 | Great Britain | Jan. 24, 1947 |